United States Patent
Burnett et al.

(10) Patent No.: US 7,324,734 B2
(45) Date of Patent: Jan. 29, 2008

(54) ARBITRARY SURFACE OPTICAL ELEMENT AND METHOD OF MAKING THE SAME

(75) Inventors: William Robert Burnett, Menlo Park, CA (US); Kathleen Hannon Davies, Fremont, CA (US); Paul D. Frey, San Francisco, CA (US); Qing Guo, Shanghai (CN); Charles Chia-ming Chuang, Shanghai (CN); David Daniel Poppell, Shanghai (CN)

(73) Assignee: N-Lighten Technologies, Chino Hills, CA (US)

( * ) Notice: Subject to any disclaimer, the term of this patent is extended or adjusted under 35 U.S.C. 154(b) by 0 days.

(21) Appl. No.: 11/533,763

(22) Filed: Sep. 20, 2006

(65) Prior Publication Data

US 2007/0081786 A1  Apr. 12, 2007

Related U.S. Application Data

(60) Provisional application No. 60/720,303, filed on Sep. 23, 2005.

(51) Int. Cl.
G02B 5/08 (2006.01)
G02B 7/18 (2006.01)
G02B 6/00 (2006.01)

(52) U.S. Cl. ............. 385/147; 359/838; 359/871
(58) Field of Classification Search ............. None
See application file for complete search history.

(56) References Cited

U.S. PATENT DOCUMENTS 3,873,191 A * 3/1975 Veret et al. ............. 359/869
4,733,246 A * 3/1988 Rubin et al. ............. 343/912
4,739,345 A * 4/1988 Namba et al. ............. 346/137
6,601,960 B2 * 8/2003 Richard ............. 359/883
6,631,994 B2  10/2003 Suzuki et al.
6,738,200 B2  5/2004 Handa et al.
6,754,012 B2  6/2004 Terauchi
6,994,442 B2  2/2006 Kurematsu et al.
7,036,932 B2  5/2006 Boulineau et al.

FOREIGN PATENT DOCUMENTS

| CN | 1577076 A | 2/2005 |
| JP | 1-131623 A | 5/1989 |
| JP | 7-96527 A | 4/1995 |
| JP | 2001-4816 A | 1/2001 |

OTHER PUBLICATIONS

Alexander Do, "Evaluation of a Short-run injection molding process with somos nanoform 15120 tooling" UC Berkeley, Dec. 2005.
Process Guide—Injection Molding of KOPA66, no date.

* cited by examiner

*Primary Examiner*—Sung Pak
*Assistant Examiner*—Omar Rojas
(74) *Attorney, Agent, or Firm*—Thelen Reid Brown Raysman & Steiner; Aaron Wininger

(57) ABSTRACT

An arbitrary surface optical element, such as a mirror for use in a rear projection television, includes a non-optical portion and an optical portion. The non-optical portion circumscribes the optical portion and has a thickness greater than the optical portion. Accordingly, the two portions cool at approximately the same rate, thereby minimizing warpage from differential cooling.

21 Claims, 4 Drawing Sheets

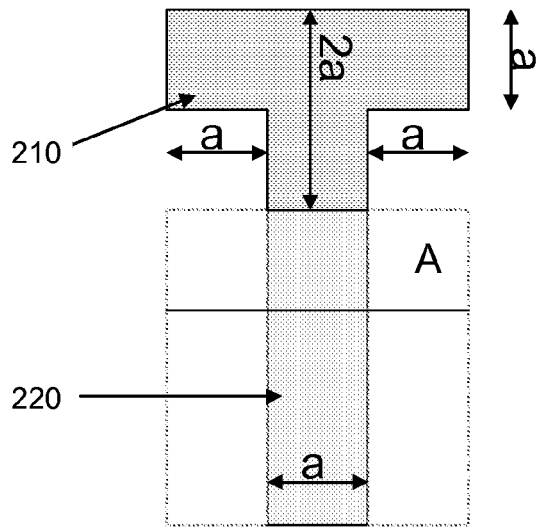
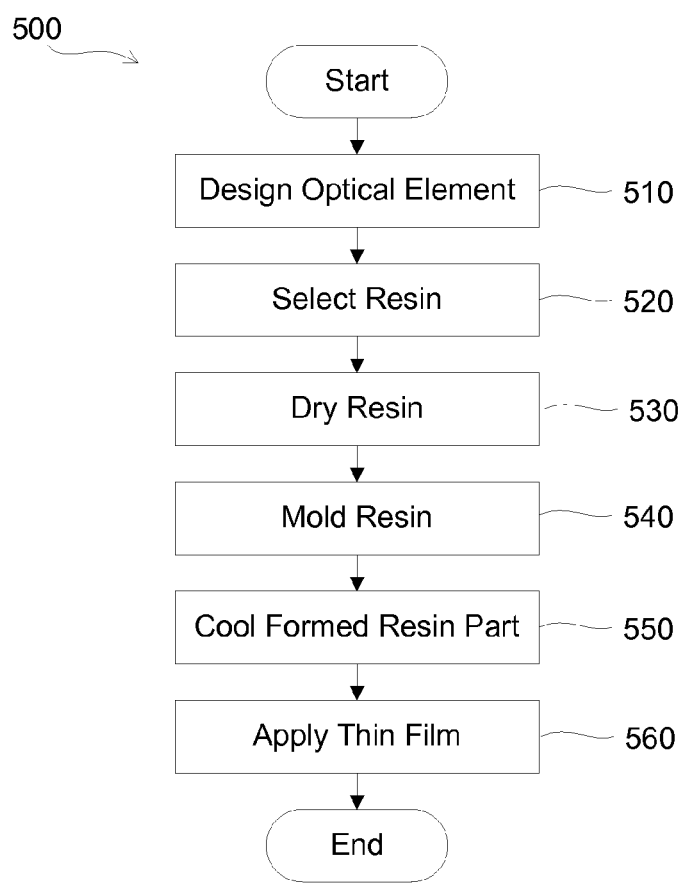
FIG. 4
FIG. 5

ARBITRARY SURFACE OPTICAL ELEMENT AND METHOD OF MAKING THE SAME

PRIORITY REFERENCE TO PRIOR APPLICATIONS

This application claims benefit of and incorporates by reference U.S. patent application Ser. No. 60/720,303, entitled "Method of Making Arbitrary Surface Mirrors," filed on Sep. 23, 2005, by inventors William Burnett et al.

TECHNICAL FIELD

This invention relates generally to projection displays, and more particularly, but not exclusively, provides an arbitrary surface optical element and method of making the same for use in projection displays and other devices.

BACKGROUND

Conventionally, molded plastic optical parts are limited to small lens and flat sheet applications. Molded arbitrary surface plastic parts are not used for optical applications because it is very difficult to achieve the dimensional control needed for optical applications. For typical optical applications, dimensional control of 0.05% is needed. For precision optical applications, dimensional control of 0.005% is needed.

Conventionally, mirrors are made from glass that has been coated with a thin layer of aluminum or silver. When used in a rear projection television (RPTV) or other optical system, mirrors are often coated on the reflective or first surface side. This avoids secondary and tertiary reflections caused by the glass/air interface. These reflections can cause ghost images and destroy the fidelity of the mirror. Glass is generally used as the substrate because it can be made very flat, is chemically inert, and thermally stable. The flatness is important for accurate one-to-one reproduction of the reflected image. The chemical inertness is important because you do not want an adverse chemical reaction between the aluminum or silver coating and the mirror substrate. This is particularly important with silver, which is the most reflective, but also can be easily damaged by chemicals migrating out of the substrate. Thermal stability is important because the coating process is done at high temperatures.

Most first surface mirrors are plated in a vacuum chamber where the aluminum is deposited in a very thin film, typically only a few micro-inches thick. This makes a very reflective and smooth surface, as flat and smooth as the glass substrate itself.

In various applications there is a need for mirrors that have different surface shapes. Mirrors that have an inward curve or an outward curve are useful. Mirrors that have curves in both directions or even arbitrary curves are also useful in some optical applications. In rear projection TV application, it is desirable to make the optical projection angle steeper in order to make the product cabinet dimension thinner. The arbitrary curve mirror is used to counteract the trapezoid geometry shape problem introduced by the steeper projection angle. This class of mirrors is often described by polynomials and can be quite complex in their surface shapes. Glass is not suitable for mass manufacturing these difficult shapes because of the difficulty forming the material.

Plastics are better suited for forming arbitrarily shapes surfaces and are cheaper and lighter in weight than optical glass. However, plastics are not thermally stable and contain organic compounds that tend to leach into the aluminum or silver plating and ruin the reflectivity. For these reasons they have not been used previously for high volume commercial first surface mirrors.

Conventionally, resin injection mold tools for forming plastic parts are Class A molds and are made out of high quality hardened steel, and can achieve dimensional tolerance well under 0.005%.

However, formed resin parts may have a shrinkage factor of about 0.5 to about 4%, the majority of the shrinkage occurs in the mold tool, as the resin cools from a temperature above its melting point, to a temperature below its glass transition temperature. About 15-30% of the shrinkage occurs after the resin part is ejected from the mold and allowed to cool to the room temperature. For cost and capacity throughput reasons, often the injected part is not allowed to cool down to room temperature in the mold.

Typical plastic resin part warpage from molding can be controlled to about +/−0.5% if the molding condition is well controlled. However, +/−0.5% is still an order of magnitude higher than the requirement for optical applications. For the most part, it is differential shrinkage of the injected part within the mold and without the mold that causes the part to deform and deviate from the tight tolerance of the mold.

The warpage is typically caused by differential cooling when the part is ejected from the tool. The thin edge(s) of a typical optical part are exposed to ambient air in 3 sides and can cool relatively faster than the center of the optical element. Even though the plastic resin is below its glass transition temperature, differential cooling still causes differential stress to build up and deform the shape beyond the range needed for optical application.

As such a new resin part and method of manufacture having less warpage are required.

SUMMARY

An arbitrary surface optical element, such as a mirror for use in a rear projection television, includes a non-optical portion and an optical portion. The non-optical portion circumscribes the optical portion and has a thickness greater than the optical portion. Accordingly, the two portions cool at approximately the same rate, thereby minimizing warpage from differential cooling.

In an embodiment, an optical element comprises a part having a non-optical portion and an optical portion, the non-optical portion having a thickness greater than the optical portion; and a reflective layer on at least the optical portion of the part.

In an embodiment, a method of manufacturing the optical element comprises: molding a resin into a part with a mold, the part having a non-optical portion and an optical portion, the non-optical portion having a thickness greater than the optical portion; cooling the part; and applying thin film layers onto the part. The thin film layer can have a reflective layer, a polarizing layer, a photochromic layer, a melanin layer, a color filter, or an infrared filter, and any combinations thereof.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 is a diagram illustrating a cross section of the portion;

FIG. 5 is a flowchart illustrating a method of manufacturing the mirror; and

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
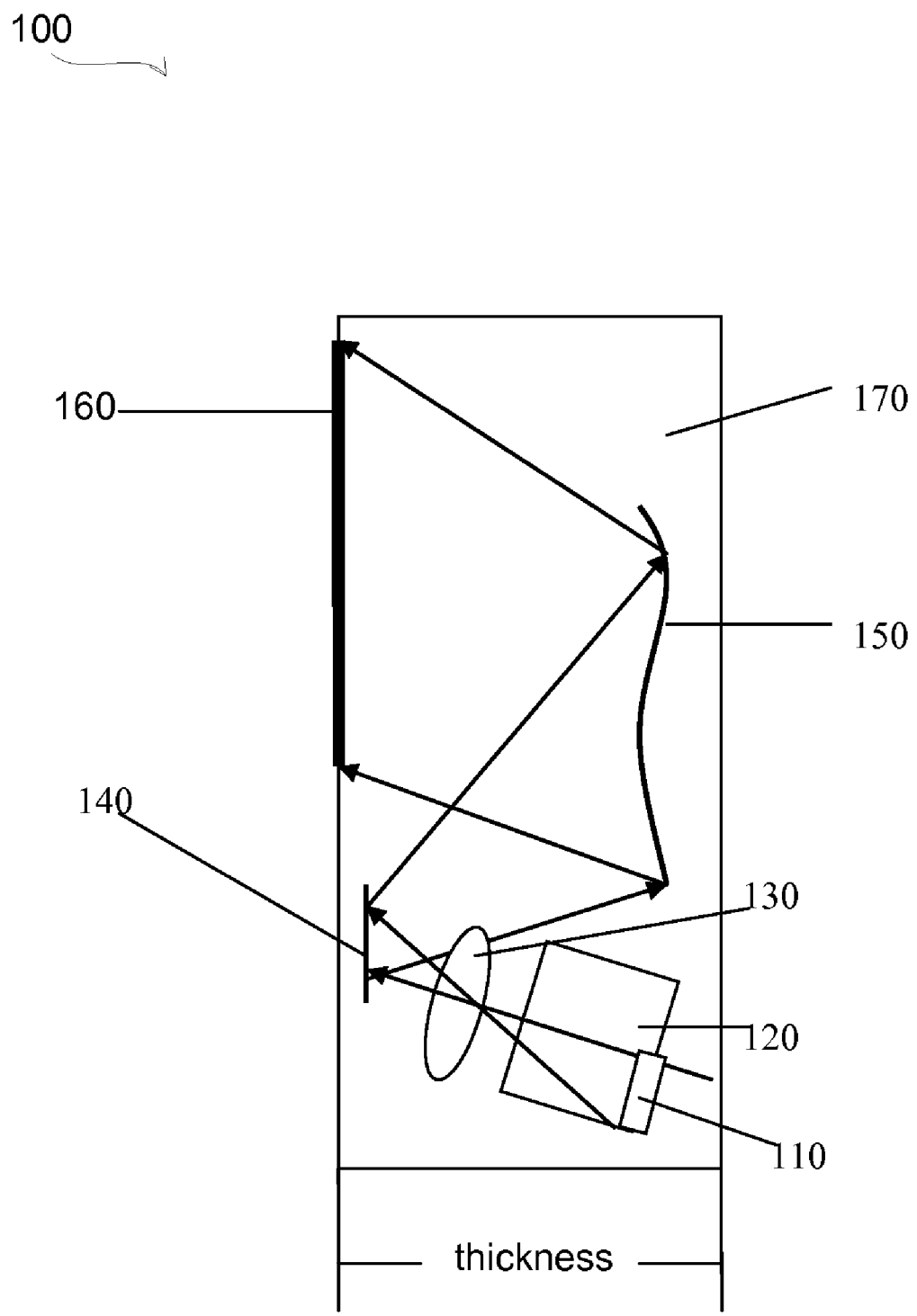
FIG. 1 is a diagram illustrating a rear projection television according to an embodiment of the invention.

FIG. 1 is a diagram illustrating a rear projection television (RPTV) 100 according to an embodiment of the invention. The RPTV 100 comprises a microdisplay light valve 110, an optical engine 120, a projection lens 130, a first (e.g., small flat) mirror 140, a second (large multisurface) mirror 150, and a screen 160 with a diagonal dimension of 50 inches or more. The components of the RPTV 100 are housed within an enclosure 170, which has a thickness of about 8.5 inches or less.

During operation of the RPTV 100, the optical engine 120 projects optical images through the projection lens 130 onto the first mirror 140, which are reflected to the second mirror 150, and then through the rear projection screen 160 to a viewer. In another embodiment of the invention, the RPTV 100 includes a single fold mirror TV, i.e., there is only the second mirror 150 and no first mirror 140. In a single fold mirror TV, the optical engine 120 projects the image to a large mirror which relays the images through a rear projection screen to a viewer in front of the screen.

The second mirror 150, as will be discussed further below, is a multi-surface mirror formed of a resin with high precision (e.g., dimensional control under +/−500 nm/mm). As such, the high precision of glass is achieved with the low cost of a resin base.

Figure 2:
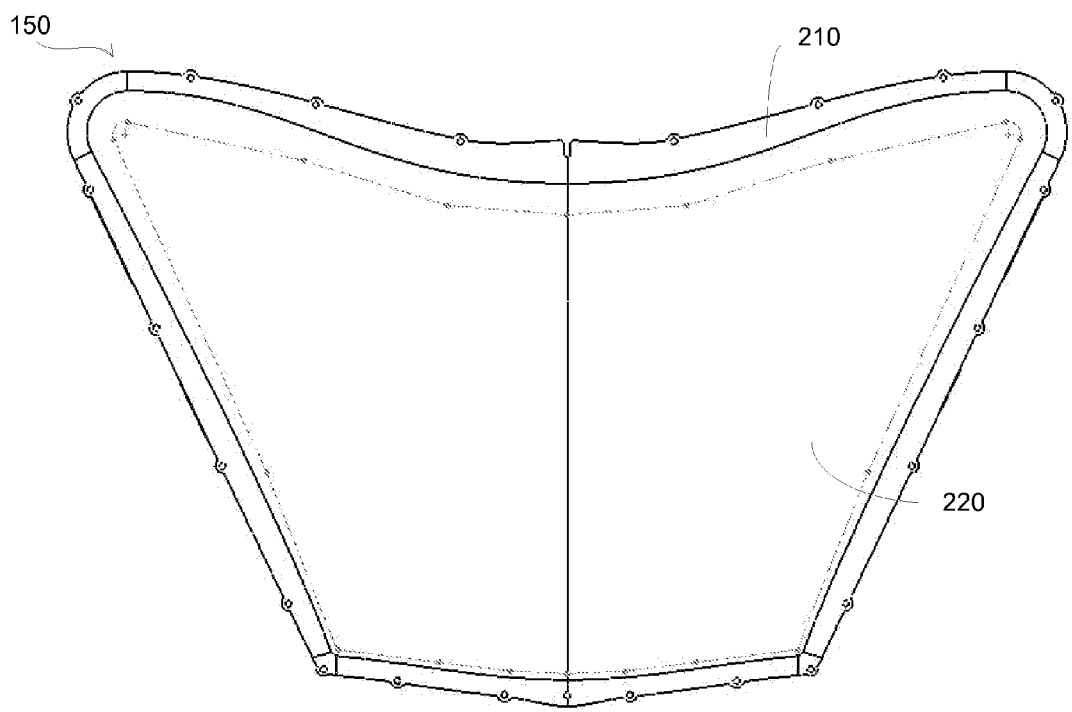
FIG. 2 is a diagram illustrating a mirror of the rear projection television.

FIG. 2 is a diagram illustrating the second mirror 150 of the rear projection television 100. The second mirror 150 includes a resin based arbitrary surface optical element with high precision (about 0.05%) over about 80% of the optically area, for areas as large as about 0.5 $M^2$ in area. The mirror 150 comprises a non-optical area (or portion) 210 surrounding an optical area (or portion) 220 along the optical area 220 edges (but not face or rear). The non-optical area 210 has more thermal mass (for slower cooling to counteract edge effect) in general than the optical area 220. Generally, edges of a conventional mirror will cool about two to four (e.g., three) times as fast as the interior. As such, the non-optical area 210 can extend outward of the optical area for about at least twice the average thickness of the optical area 210. The non-optical area 210 can have a cross section area about at least four times the cross sectional area defined by the average thickness multiplied by the average thickness.

In an embodiment of the invention, the mirror 150 has a length of about 800 mm (e.g., 796.59 mm) and a height of about 500 mm (e.g., 506.22 mm). The mirror thickness in optical area 220 is about 4.0 mm. The tallest structure in non-optical area 210 is about 53.95 mm.

The non-optical area 210 can have other functional usages in addition. In an embodiment, the non-optical area 210 can provide for mechanical mounting purposes and/or include integrated thermal sensors without intrusion into optical area.

Figure 3:
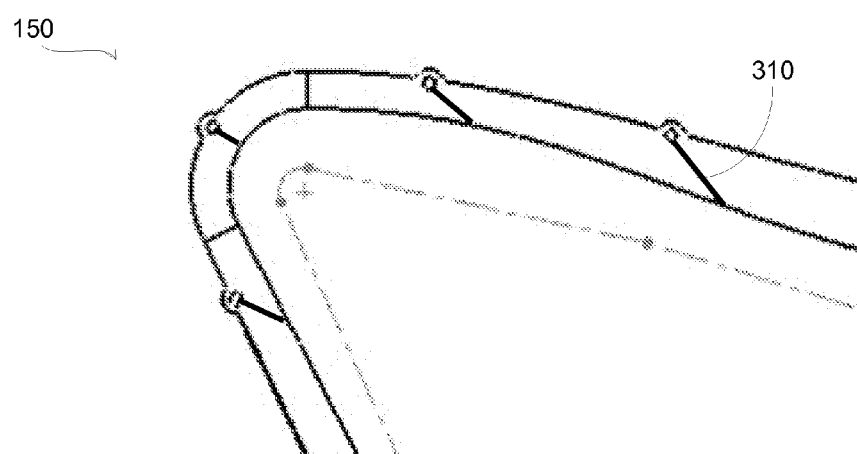
FIG. 3 is a diagram illustrating a portion of the mirror.
Figure 6:
FIG. 6 is a diagram illustrating various layers of the mirror.

The non-optical area 210, in an embodiment, includes features that are used to minimize parts warping, such as ribs 310 (FIG. 3). The ribs 310 can have a thickness equal to or less than about the thickness of the optical area 220. In addition, portions or the entire non-optical area 210 can be trimmed off and removed as secondary operation after cooling.

The mirror 150 is formed of a resin with a low shrinkage factor, generally below about 1.8%. Actual shrinkage factor vary in accordance with the additive used, process condition, thickness and shape of the part, and a low shrinkage material helped in retaining the shape needed for optical application. Amorphous material is better than crystalline material to prevent local distortions. Glass transition temperature shall be high enough (<80° C.) for stability in operating environment (<45° C.) in an embodiment. Water absorption through the resin can change the shape slightly. Low water absorption coefficient, generally at about 0.3 wt % or lower, is preferred in an embodiment. Examples of possible material include a general class of Polycarbonate, such as polymethylmethacrylate (acrylic) (PMMA), Nylon, Polyester, and Polystyrene. Additives for ease of mold release and heat stabilizer can also be added to the resin.

After the resin is formed into shape for the mirror 150, it is coated, in one embodiment, with a plurality of layers. Layers can include a moisture barrier film; a chemical barrier film; an adhesion primer (if needed); a reflective film (e.g., aluminum, silver) and/or a protection film. Manufacture of the mirror 150 will be discussed further below in conjunction with FIG. 5.

FIG. 4 is a diagram illustrating a cross section of the portion. In an embodiment, the optical area 220 has a thickness of about a. In comparison, the non-optical area 210 extends outwards from the optical area 220 by a distance of about 2a. In addition, a rib in the non-optical area can have a length of about 3a with a thickness of about 0.5 times a. As edge thermal resistance is about ⅓ of the bulk the optical area 220, adding a non-optical area 210 have three times the bulk can approximately equalize cooling rates across the mirror 150, thereby reducing effects of differential cooling.

FIG. 5 is a flowchart illustrating a method 500 of manufacturing the mirror 150. First, the arbitrary surface optical element is designed (510) and a mold built accordingly. As discussed above, the element should have a non-optical area surrounding an optical area to enable even cooling between the two areas. A resin is then selected (520) as discussed above. The resin is then dried (530). The resin material can be dried per manufacturers' instructions, just before molding (540) to minimize variability.

The resin is then molded (540) according to the designing (510). The molding condition is within the process envelop prescribed by the material supplier. The mold can be made of hardened steel with Class A tooling requirements. It should have Rockwell C scale of >50 HRC. The mold requires tight tolerance for optical performance with smooth surfaces needed for optical performance. Examples of molds include those manufactured by Stavax and others. The mold can include a thermal regulator design for both cavity and core, which enables differential Molding Temperature Control (core and cavity). Cooling and heating can use water, ethylene glycol, and/or oil. Since most of the part shrinkage occurs as the resin cools from a temperature above its melting point, to a temperature below its glass transition temperature within the tool, temperature regulation of tool cavity and core can impact the shape of the final part. Cavity and core thermal regulation parameters are often determined during the process optimization cycle.

The resin is then cooled (550). The cooling cycle is less than about 10 minutes in one embodiment. Formed resin parts may have shrinkage factor of about 0.5 to about 4%, and about 15 to about 30% of the shrinkage occurs after the resin part is ejected from the mold and allowed to cool to the room temperature. As such, a cooling fixture may be used to ensure a uniform cooling environment to prevent further warpage. In an embodiment, a semi-enclosed fixture to even out cooling may be used. This enclosure is slightly larger than the formed resin parts with one or two openings. It forms a local environment to slow down cooling and to minimize edge cooling effects.

For mirror application where only one surface is critical, a metal fixture with a large thermal mass, and with the correct surface profile can be used. The formed resin parts are placed on this metal fixture immediately out of the mold. Clamping force is applied to ensure uniform cooling. Typical air cooling cycle is about 5-15 minutes. As such, the cooling time is much reduced over conventional methods with significantly less warpage, enabling a resin part to be manufactured with needed precision to be used in optical applications.

After cooling (550), a reflective film is applied to the part (560). Two processes are possible including metal evaporation and lamination. Metal Evaporation after parts are formed, comprises: surface cleaning; placing the part into a vacuum chamber, evacuating air from the chamber, evaporating a moisture barrier film onto the part; evaporating a chemical barrier film onto the moisture barrier film; evaporating an adhesion primer (if needed) onto the chemical barrier film; evaporating a reflective film such as aluminum or silver onto the adhesion primer or moisture barrier film; and evaporating a protection film onto the reflective film.

For lamination, films may be heated and formed with vacuum over mold. Films for lamination include: a film with chemical barrier/moisture barrier base material; an additional barrier/primer coating for adhesion; a plastic base and film base material having same plastic forming temperature and lower than adhesive melting temperature.

More specifically, lamination includes laminating a highly reflective plated film to a thermoplastic base material. Then this composite material is heated and formed with a vacuum over a mold of arbitrary dimension and surface shape to create the required mirror.

The lamination of the film to the base is done without introducing non-uniformities in the surface. A pressure sensitive or thermo set adhesive is used that has a higher melt temperature than either the film or the base material to insure adhesion during the forming process. Examples of adhesives include those based on isocyanate, acrylate, polyhurethane, and epoxy.

A highly reflective film can be used instead of a vacuum metallization process because the film can be mass produced in a continuous roll process by conventional manufacturing processes, resulting in a very low cost per square area for the mirror surface.

The highly reflective film is made from a stable thermoformable base material that acts as a chemical barrier between the reflective aluminum or silver coating and the mirror base material. This way organic compounds that leach out of the base material over time do not affect the reflectivity of the mirror.

An additional barrier or primer coating can be applied to the base material to improve the adhesion of the silver or reflective layer.

The highly reflective film is made from a stable thermoformable base material that acts as a vapor barrier between the reflective aluminum or silver coating and the mirror base material. This way moisture that leaches out of the base material over time does not affect the reflectivity of the mirror.

An inexpensive plastic base can then be used. The plastic base is designed to have a plastic forming temperature that is match to the base material of the highly reflective film. This way they both melt and become formable at the same time and the film will stretch with the base material when it forms itself over the mold, urged into position by the vacuum. Note that the adhesive layer that bonds the two together in a composite structure melts at a higher temperature so that the plastic base and film are constrained to move together.

In an embodiment, vacuum can be applied to one side, while pressure is applied to the other side to provide extra force in forming a complex mirror shape.

In addition, the mold may be disposable, called a buck that is made of an inexpensive but rigid material such as expanded polystyrene. The buck is first molded in a precise process like injection molding and then is used to form the mirror over it in a vacuum or pressure forming process. The buck then becomes a part of the mirror and provided additional structure and mounting details for the mirror in an assembly.

In an embodiment, the method 500 uses a base thermoformed part that is first injection molded to the net shape of the complex mirror. This part is molded with a series of very small holes, or is molded in a material that is porous enough to pull a vacuum through the base. Then this base is coated with the same adhesive referred to above and the mirror film in thermoformed to the base, thereby completing the mirror.

In another embodiment, the complex base part injection molded part and the highly reflective film is placed in the mold, prior to injection. In this case the heat and pressure of the injection molding process fuses the highly reflective film to the base.

The foregoing description of the illustrated embodiments of the present invention is by way of example only, and other variations and modifications of the above-described embodiments and methods are possible in light of the foregoing teaching. For example, the arbitrary surface optical element can be used in any device requiring it and is not limited to RPTVs. For example, the arbitrary surface optical element may have an applied thin film that is not just a mirror. The film can be a polarizing layer, a photochromic layer, a melanin layer, a mirror layer, a color filter, or an infrared filter, and any combinations thereof The embodiments described herein are not intended to be exhaustive or limiting. The present invention is limited only by the following claims.

What is claimed is:

1. An optical element, comprising:
   a part having a non-optical portion and a optical portion, the non-optical portion circumscribing edges of the optical portion and having a thermal mass greater than the optical portion such that the cooling rates of the non-optical and optical portions during joint manufacture are about equal to counteract edge effect experienced by the combined portions during the joint manufacture; and
   a thin film layer on at least the optical portion, the thin film including one or more of a polarizing layer, a photochromic layer, a melanin layer, a mirror layer, a color filter, or an infrared filter.

2. The optical element of claim 1, wherein the part is formed of a thermoplastic material and wherein the element further comprises a protective film between a metallic layer and the part.

3. The optical element of claim 2, wherein the film is adhered to the part with a pressure sensitive or thermo set adhesive that has a higher melt temperature than either the film or a base material of the part.

4. The optical element of claim 1, wherein the part is formed on a mold that forms a base of the optical element.

5. The optical element of claim 1, wherein the non-optical portion includes at least one rib.

6. The optical element of claim 1, wherein the non-optical portion extends outward from the optical portion with a dimension that is at least about twice the thickness of the optical portion.

7. The optical element of claim 1, wherein the thin film is a polarizing layer.

8. The optical element of claim 1, wherein the thin film is a photochromic layer.

9. The optical element of claim 1, wherein the thin film is a melanin layer.

10. The optical element of claim 1, wherein the thin film is a mirror layer.

11. The optical element of claim 1, wherein the thin film is a color filter.

12. The optical element of claim 1, wherein the thin film is an infrared filter.

13. A display, comprising:
    a screen;
    an optical engine that projects images; and
    a first mirror positioned to reflect the images from the optical engine onto the screen, the mirror having a non-optical portion and an optical portion, the non-optical portion circumscribing edges of the optical portion and having a thermal mass greater than the optical portion such that the cooling rates of the non-optical and optical portions during joint manufacture are about equal to counteract edge effect experienced by the combined portions during the joint manufacture.

14. The display of claim 13, wherein the optical portion includes a thin film layer disposed thereon.

15. The display of claim 14, wherein the thin film includes one or more of a polarizing layer, a photochromic layer, a melanin layer, a mirror layer, a color filter, or an infrared filter.

16. The display of claim 13, wherein the part is formed of a thermoplastic material and wherein the element further comprises a protective film between a-metallic layer and the part.

17. The display of claim 16, wherein the film is adhered to the part with a pressure sensitive or thermo set adhesive that has a higher melt temperature than either the film or a base material of the part.

18. The display of claim 13, wherein the part is formed on a mold that forms a base of the optical element.

19. The display of claim 13, wherein the non-optical portion includes at least one rib.

20. The display of claim 13, wherein the non-optical portion extends outward from the optical portion with a dimension that is at least about twice the thickness of the optical portion.

21. The display of claim 13, further comprising a second mirror positioned to reflect the images from the light engine onto the first mirror.

* * * * *